United States Patent
Clark

(10) Patent No.: US 10,422,469 B2
(45) Date of Patent: Sep. 24, 2019

(54) TRIPOD HEAD

(71) Applicant: Graham Clark, Clark, CO (US)

(72) Inventor: Graham Clark, Clark, CO (US)

(73) Assignee: New Ideas Manufacturing LLC, Englewood, CO (US)

( * ) Notice: Subject to any disclaimer, the term of this patent is extended or adjusted under 35 U.S.C. 154(b) by 34 days.

(21) Appl. No.: 15/948,911

(22) Filed: Apr. 9, 2018

(65) Prior Publication Data

US 2018/0292043 A1 Oct. 11, 2018

Related U.S. Application Data

(63) Continuation-in-part of application No. 62/484,069, filed on Apr. 11, 2017.

(51) Int. Cl.
| | |
|---|---|
| *F16C 11/06* | (2006.01) |
| *F16C 11/10* | (2006.01) |
| *F16M 11/12* | (2006.01) |
| *F16M 11/14* | (2006.01) |
| *F16M 11/18* | (2006.01) |
| *F16M 11/24* | (2006.01) |
| *G03B 17/56* | (2006.01) |

(52) U.S. Cl.
CPC ......... *F16M 11/14* (2013.01); *G03B 17/561* (2013.01); *F16C 11/0604* (2013.01); *F16C 11/10* (2013.01); *F16M 11/12* (2013.01); *F16M 11/18* (2013.01); *F16M 11/242* (2013.01); *F16M 2200/021* (2013.01)

(58) Field of Classification Search
CPC .................................................. G03B 17/561
USPC ........................................................ 396/428
See application file for complete search history.

(56) References Cited

U.S. PATENT DOCUMENTS

| | | | | |
|---|---|---|---|---|
| 1,894,456 | A * | 1/1933 | Zerk ...................... | F16M 11/10 248/181.1 |
| 8,848,101 | B2 * | 9/2014 | Zarpellon .............. | F16M 11/12 348/373 |
| 8,870,474 | B1 * | 10/2014 | Dumm ................... | F16M 11/10 396/419 |
| 2003/0142973 | A1 * | 7/2003 | Sawada ................. | F16M 11/10 396/427 |
| 2010/0051774 | A1 * | 3/2010 | Shi ......................... | F16M 11/10 248/349.1 |
| 2013/0108255 | A1 * | 5/2013 | Vogt ...................... | F16M 11/041 396/428 |
| 2013/0136440 | A1 * | 5/2013 | Hida ...................... | F16M 11/10 396/428 |
| 2013/0163978 | A1 * | 6/2013 | Carlesso ................ | F16M 11/14 396/428 |

* cited by examiner

*Primary Examiner* — Clayton E. LaBalle
*Assistant Examiner* — Kevin C Butler
(74) *Attorney, Agent, or Firm* — Christopher Pilling

(57) ABSTRACT

An improved tripod head including a cylindrical body having a cavity and a ball joint rotationally positioned into the cavity. A stem is attached to the ball joint, the stem having an attached camera mount configured to accept and hold a camera steady during operation. A positional feature provided on a front portion of the cylindrical body, the positional feature providing to a larger range of motion when the stem is in a horizontal position compared to the prior art. The stem in a horizontal position corresponds to portrait mode photography.

7 Claims, 5 Drawing Sheets

TRIPOD HEAD

CROSS-REFERENCE TO RELATED APPLICATIONS

This application is a claims priority to U.S. provisional application Ser. No. 62/484,069 entitled "Tripod Head" filed Apr. 11, 2017 hereby incorporated by reference.

BACKGROUND OF THE INVENTION

1. Field of the Invention

The present invention relates generally to camera accessories, but more particularly to a tripod head designed to hold a camera steady in a precise position.

2. Description of Related Art

There are some problems and unmet needs with existing tripod head designs. Every tripod head needs to drop the secured camera into a vertical orientation. Currently, ball tripod head designs are limited in range of motion. Theoretically, the ball joint can move in a 360-degree circle, thus delivering the upper limit of adjustability. However, a typical tripod head with a ball joint does not include true pan or tilt adjustment capabilities, and the actual range of motion is very limited. Consequently, there is a need for a tripod head with a larger range of motion enabling more camera position options.

BRIEF SUMMARY OF THE INVENTION

In one embodiment of the present invention a tripod head is provided, comprising a cylindrical body having a cavity, the cylindrical body attached to a rotatable base, the rotatable base configured to be attached to a tripod; a ball joint rotationally positioned into the cavity; a stem attached to the ball joint; a camera mount attached to the stem, the camera mount configured to accept and hold a camera steady during operation; a positional feature provided on a front portion of the cylindrical body, the positional feature comprising an opening, a pair of vertically opposed parallel surfaces leading into a first pair of angled surfaces configured to expand a width of the positional feature, wherein the first pair of angled surfaces conform into a pair of pan surfaces, the pair of pan surfaces leading into a second pair of angled surfaces which meet centrally into a U-shaped tilt surface, wherein the opening enables the stem to enter the positional feature when the ball joint is rotated during operation.

In one embodiment, the pair of pan surfaces define a horizontal panning width corresponding to a maximum horizontal range of motion when the stem is in a horizontal position. In one embodiment, the opening has an opening width and the horizontal panning width is wider than the opening width. In another embodiment, the ball joint is a hollow ball.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF THE PREFERRED EMBODIMENT

The following description is provided to enable any person skilled in the art to make and use the invention and sets forth the best modes contemplated by the inventor of carrying out their invention. Various modifications, however, will remain readily apparent to those skilled in the art, since the general principles of the present invention have been defined herein to specifically provide a tripod head with a larger range of motion enabling more camera position options than the prior art.

Figure 1:
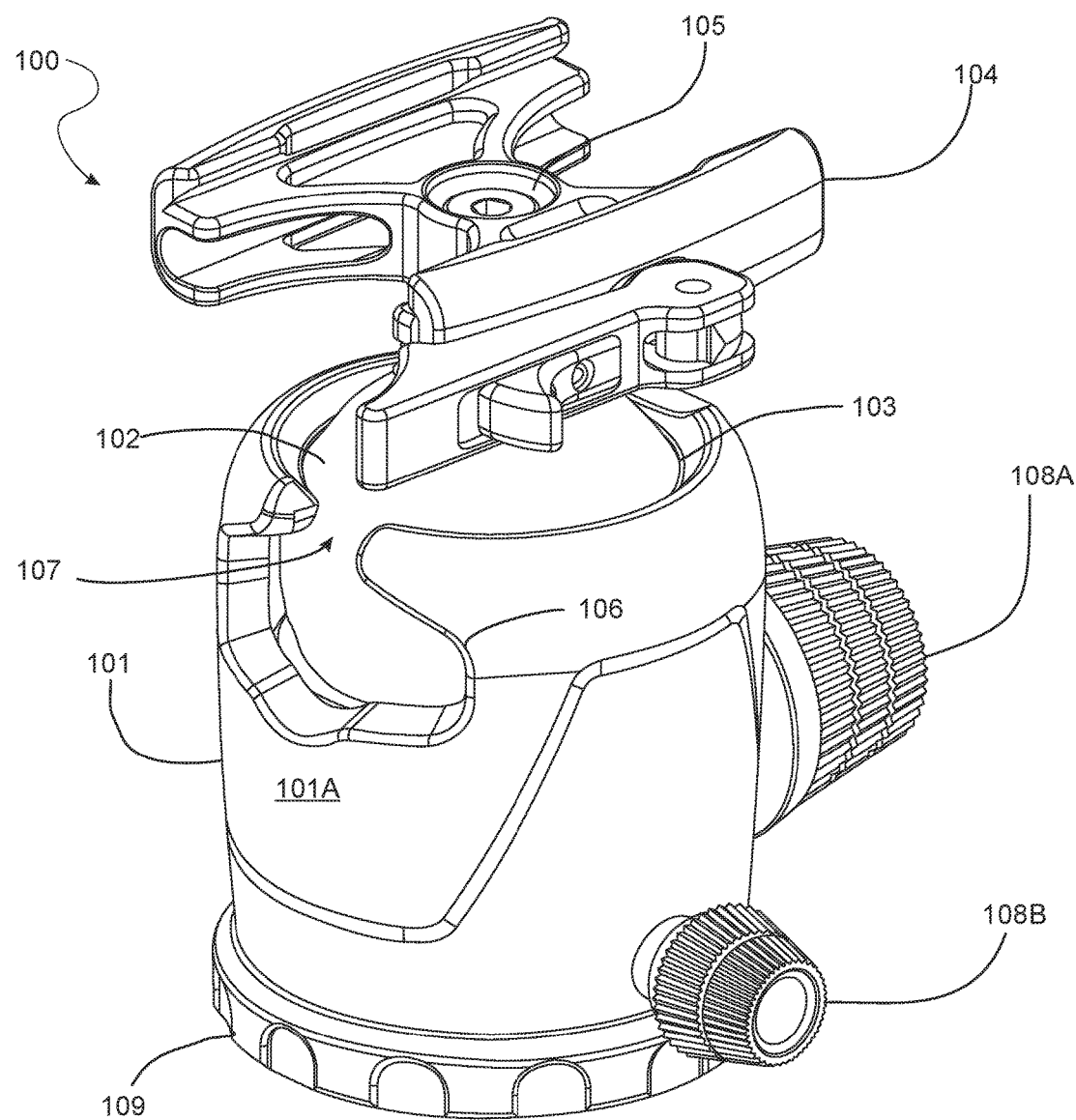
FIG. 1 is an isometric view of a tripod head according to an embodiment of the present invention.

FIG. 1 is an isometric view of a tripod head 100 according to an embodiment of the present invention. Referring now to FIG. 1, the tripod head is illustrated. The tripod head comprises a cylindrical body 101 configured to be attached to a tripod via rotatable base 109 as well known in the art. In one embodiment, a ball joint 103 is positioned into a cavity 102 of the cylindrical body, wherein the ball joint is configured to rotate in the cavity. In one embodiment, a camera mount 104 is attached to the ball joint via stem 105. The camera mount is configured to accept a camera (not illustrated), and hold the camera steady during operation. The camera may be secured to the camera mount as well known in the art.

It is a particular advantage of the present invention to provide a positional feature 106 in a front portion 101A of the cylindrical body. The positional feature has an opening 107 allowing the stem to enter the positional feature when the hall joint is rotated during operation. The operation of the tripod head and positional feature will be discussed in greater detail below. The tripod head further comprises positioning knobs 108A and 108B configured to secure the ball joint into a desired position.

Figure 2:
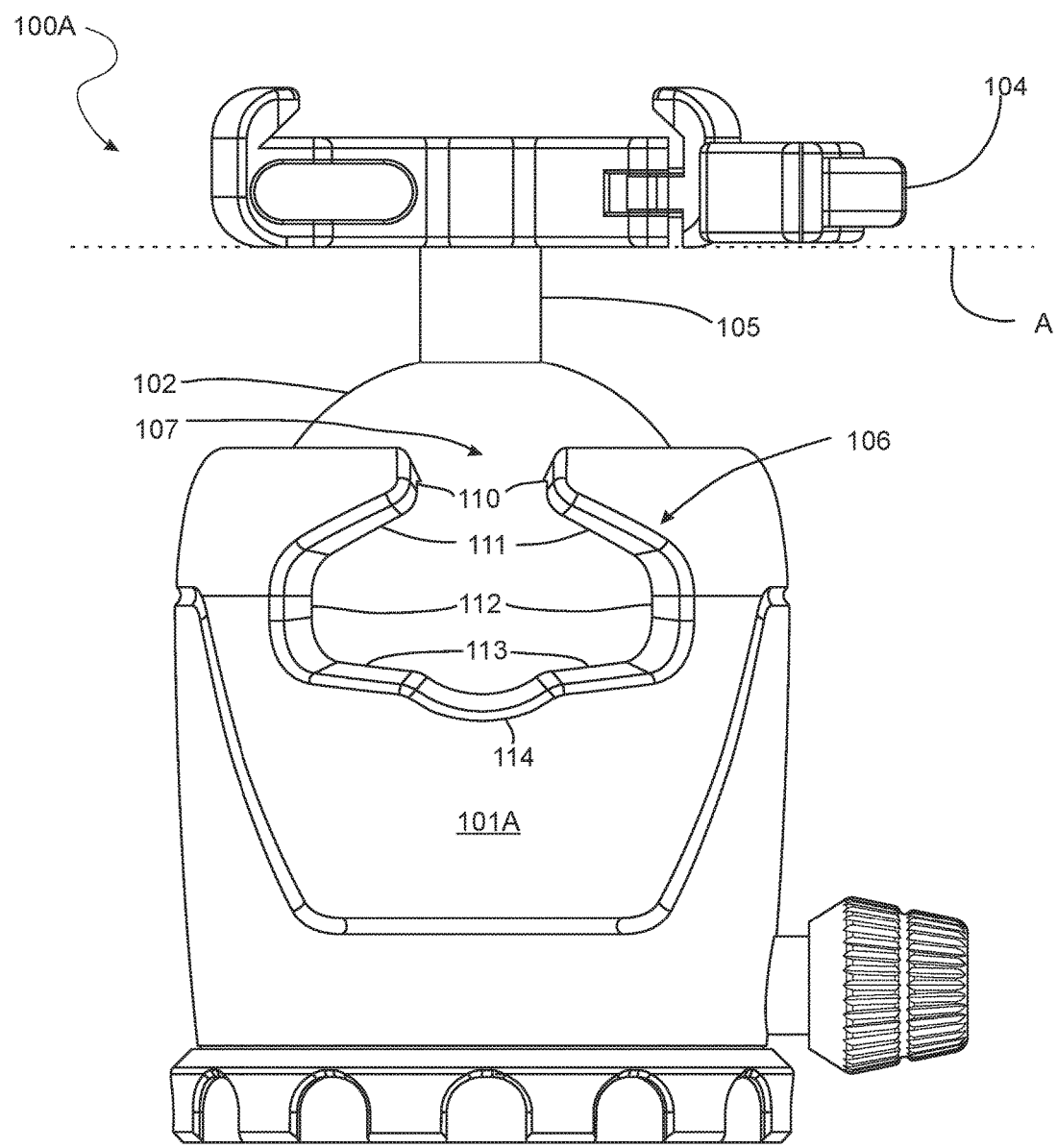
FIG. 2 is a front view thereof.

Referring now to FIG. 2, the front view of the tripod head is illustrated. In the exemplary example illustrated, the tripod head is in a first position 100A, defined as the camera mount in plane A, which is generally horizontal and parallel to the ground during use. During operation, this position corresponds to landscape mode photography. It should be understood that the ground may not be level where the tripod head and tripod (not illustrated) is used, however for the purposes of this disclosure the ground is level. In this position, stem 105 is in a vertical position.

In this view, the contours and shape of positional feature 106 may be appreciated. Approximate to opening 107, the positional feature comprises a pair of vertically opposed parallel surfaces 110 which lead into a first pair of angled surfaces 111 configured to expand the width of the positional feature. The first pair of angled surfaces conforms into a pair of pan surfaces 112 leading into a second pair of angled surfaces 113 which meet into a U-shaped tilt surface 114.

Figure 3:
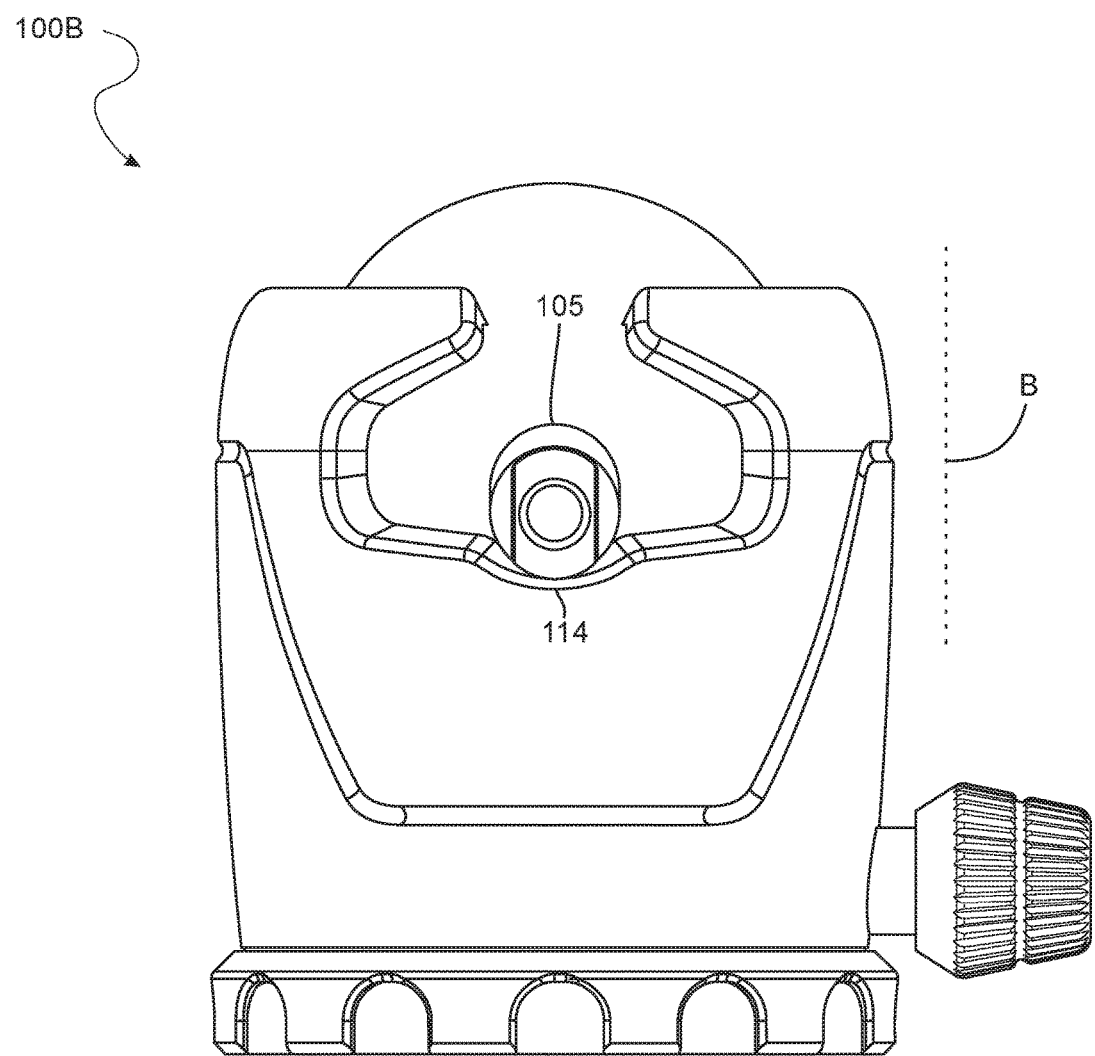
FIG. 3 is a front view of the tripod head with the stem in a second position.

FIG. 3 is a front view of the tripod head with the stem in a second position 100B. In this view and the proceeding views, the camera mount has been removed for visibility. The second position comprises the stem positioned into the U-shaped tilt surface. This is the maximum tilt the camera can rotate via the ball joint, which is defined as the camera mount aligned with a plane 13, which is generally vertical and perpendicular to the ground during use. During operation, this position corresponds to portrait mode photography. It should be noted, that if desired a user may tilt the stem and attached camera mount by rotating the ball joint to a plane between plane B and plane A. Likewise, if continuous shots or video is desired, the user can lock the ball joint to prevent horizontal rotation, and rotate the ball joint in a vertical or tilt motion while operating the camera mounted into the camera mount.

Figure 4:
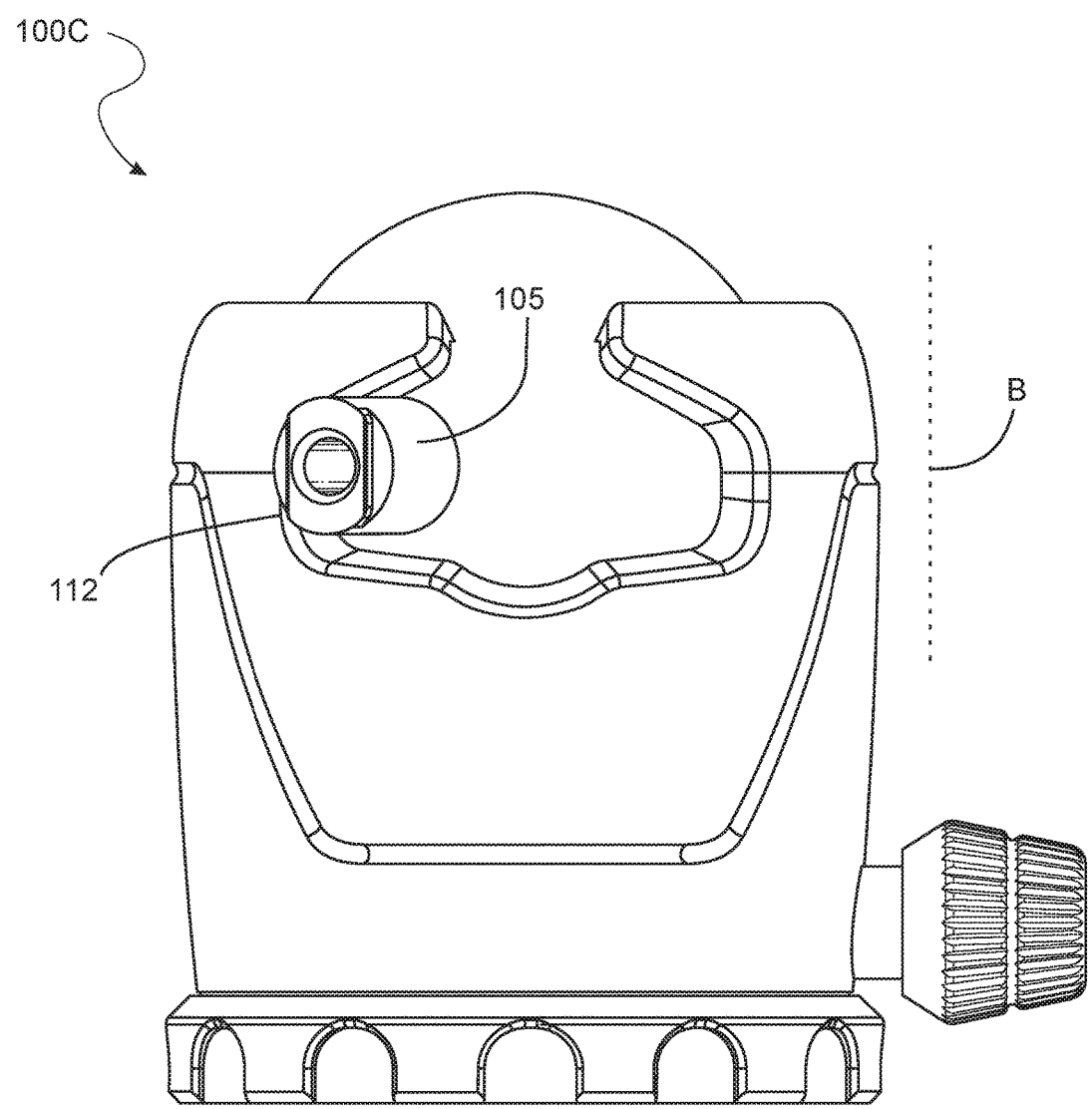
FIG. 4 is a front view of the tripod head with the stem in a third position; and, FIG. 5 is a front view of the tripod head with the stem in a fourth position.

FIG. 4 is a front view of the tripod head with the stem in a third position 100C. The third position comprises the stem positioned at a right pan surface (as orientated in relation to the operator) of the pair of pan surfaces 112. This position corresponds to the maximum range of motion for a right pan via the camera. In this position, the camera mount is aligned with the plane B, wherein the camera mount and attached camera is vertical.

Figure 5:
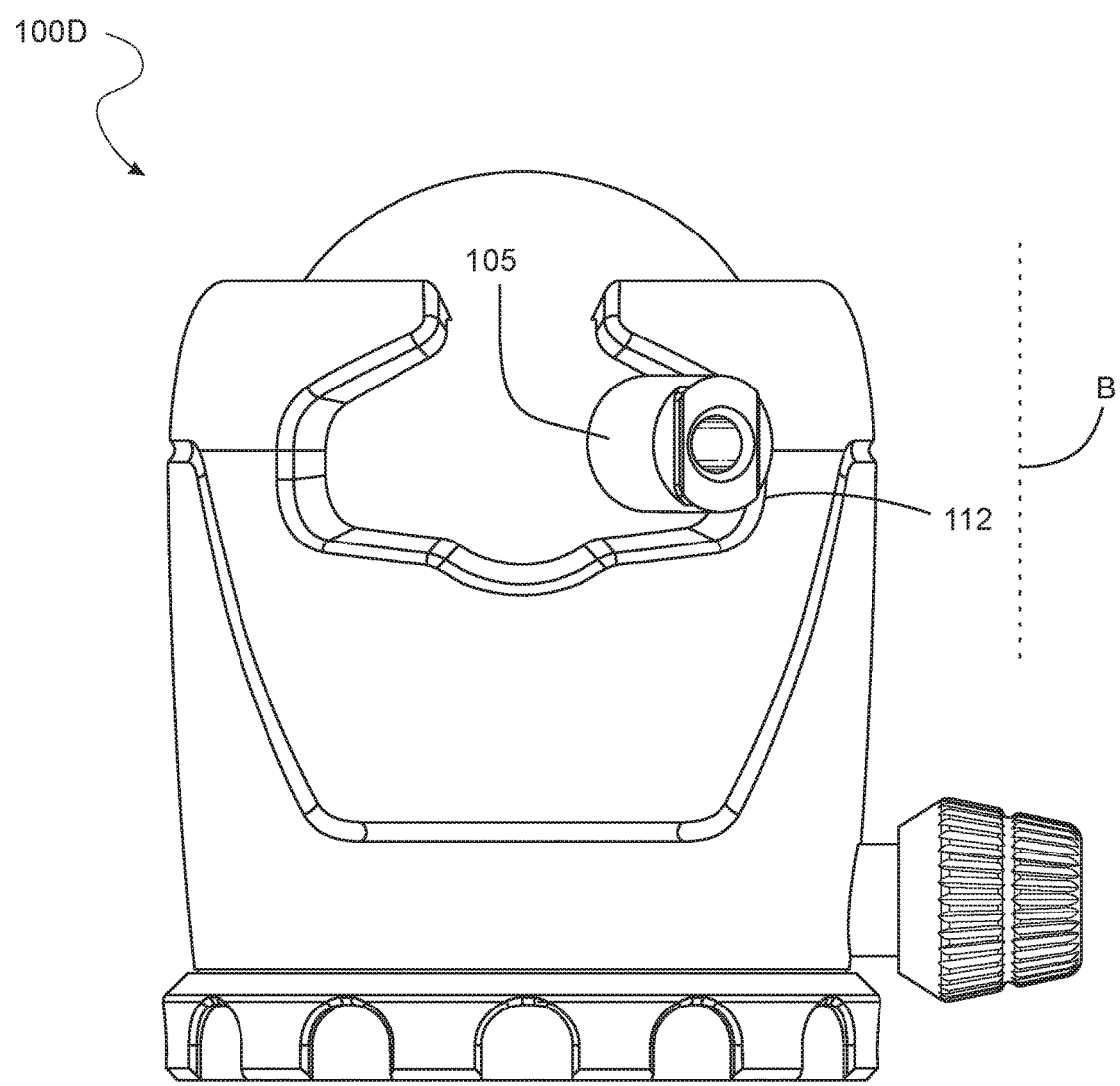

Similarly, FIG. 5 is a front view of the tripod head with the stem in a fourth position 100D. The fourth position comprises the stem positioned at a left pan surface of the pair of pan surfaces 112. This position corresponds to the maximum range of motion for a left pan via the camera. In this position, the camera mount is aligned with plane B, wherein the camera mount and attached camera is vertical.

In one embodiment, the pair of pan surfaces define a horizontal panning width (the width from one pan surface to the other pan surface) corresponding to a maximum horizontal range of motion when the stem is in a horizontal position. The opening has an opening width (the size of the opening) and the horizontal panning width is wider than the opening width.

It should be understood that the stem and attached camera mount may be positioned into a plurality of positions not illustrated, wherein the plurality of positions allow photographers to get an attached camera steady in a desired location during use. For instance, when the camera mount is aligned with plane B and the stem is in a horizontal position, the pan position is not limited to the pair of pan surfaces, such that the stem and camera mount may be locked in positioned at a position between the pair of pan surfaces. Simply put, the stem and attached camera mount may be locked in any possible position (range of motion) available for the stem to rotate via the ball joint. The positional feature allows for superior pan camera movement (panning).

In one embodiment, the ball joint is constructed from a hollow ball, providing a lighter ball joint compared to existing ball joints of the prior art, decreasing the overall weight of the tripod head. This is critical as the tripod head and tripod (not illustrated) is often carried to the operation location, thus the weight saving techniques is beneficial to the overall design of the tripod head.

Although the invention has been described in considerable detail in language specific to structural features, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A tripod head comprising:
    a body having a cavity, the body attached to a rotatable base, the rotatable base configured to be attached to a tripod;
    a ball joint rotationally positioned into the cavity;
    a stem attached to the ball joint;
    a camera mount attached to the stem, the camera mount configured to accept and hold a camera steady during operation; and,
    the body comprising an opening having a width and a pair of vertically opposed parallel surfaces leading into a first pair of angled surfaces expanding the width of the opening, wherein the first pair of angled surfaces extend into a pair of pan surfaces, the pair of pan surfaces leading into a second pair of angled surfaces which meet centrally into a U-shaped tilt surface, wherein the pair of pan surfaces enable the stem uninterrupted horizontal panning between the pair of pan surfaces when the camera mount continuously parallel to a vertical plane.

2. The tripod head of claim 1, wherein the pair of pan surfaces define a horizontal panning width corresponding to a maximum horizontal range of motion when the stem is in a horizontal position.

3. The tripod head of claim 2, wherein the opening has an opening width and the horizontal panning width is wider than the opening width.

4. The tripod head of claim 1, wherein the ball joint is a hollow ball.

5. The tripod head of claim 1, wherein the body is stationary in relation to the rotatable base.

6. The tripod head of claim 1, wherein the body encircles the ball joint.

7. The tripod head of claim 1, wherein the body is cylindrical.

* * * * *